March 14, 1961 J. F. MURRAY 2,974,605
PRESSURE LOADED HYDRAULIC APPARATUS
Filed Feb. 12, 1959
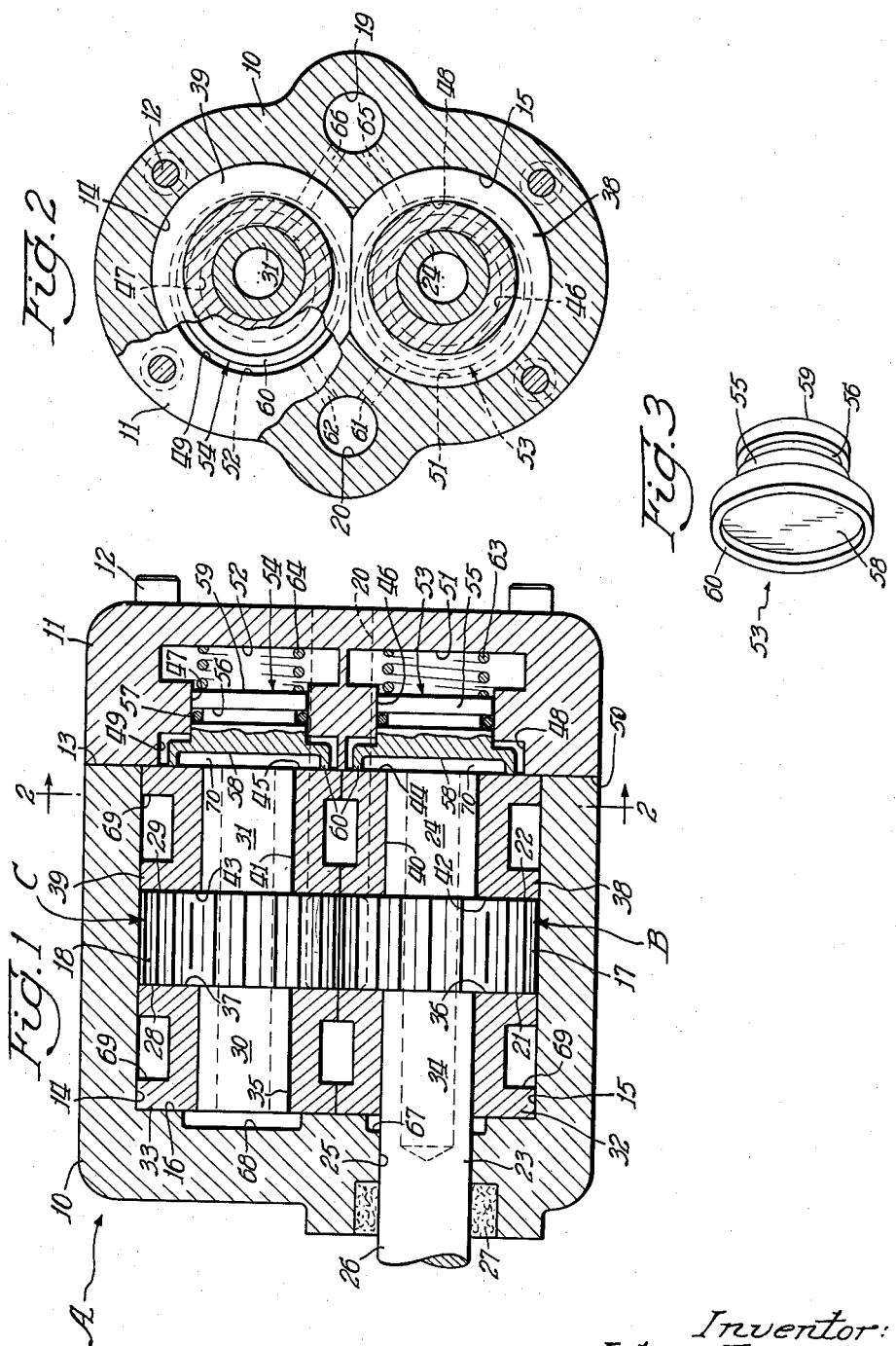
Inventor:
John F. Murray
By: Frank C. Parker Atty.

United States Patent Office 2,974,605
Patented Mar. 14, 1961

2,974,605

PRESSURE LOADED HYDRAULIC APPARATUS

John F. Murray, Northfield, Ohio, assignor to Borg-Warner Corporation, Chicago, Ill., a corporation of Illinois Filed Feb. 12, 1959, Ser. No. 792,749

7 Claims. (Cl. 103—126)

This invention relates to a pressure loaded hydraulic apparatus, and, in particular, relates to a pressure loaded pump or motor comprising a housing having rotatable pumping means disposed therein for drawing fluid from an inlet, pressurizing the fluid, and forcing it out an outlet under pressure, and axially movable bushing means carried by the housing and adapted to be axially moved into sealing engagement with the rotatable pumping means by piston means, the piston means being moved into engagement with the bushing means by the force of the pressure fluid from the outlet in such a manner that the piston means forces the bushing means into sealing engagement with the rotatable pumping means with a greater force on the outlet side of the bushing means than on the inlet side thereof.

It is well known in the art to construct pressure loaded pumps or motors, and, in particular, to construct pressure loaded gear type pumps or motors.

The conventional gear type pump or motor comprises a housing having a pair of parallel intersecting bores formed therein, a pair of meshing rotatable gears disposed in the bores, and bushing means disposed in the bores for rotatably supporting the gears and having front faces adapted to engage respective side faces of the gears to provide pumping seals therewith whereby the rotated gears (when acting as a pump) draw fluid from an inlet formed in the housing, pressurize the fluid, and force the same under pressure out an outlet formed in the housing. The bushing means normally comprise two pairs of adjacent bushings, one pair of bushing means being fixed relative to the housing and the other pair of bushing means being adapted to be axially moved into sealing engagement with the respective side faces of the gears to provide pumping seals therewith. The axially movable bushings are normally each provided with a rear motive surface which is subject to the application of the force of the outlet fluid pressure whereby the force of the outlet fluid pressure tends to axially move the bushing into sealing engagement with the respective gear side face. Because a pressure gradient condition exists across the front faces of the bushings, i.e., the force of the fluid conveyed by the gear teeth from inlet to outlet progressively and infinitely increases from inlet to outlet thereby tending to axially move the bushings away from the gear side faces, with a greater force on the outlet side thereof than on the inlet side thereof, various bushing designs have been constructed to compensate for this pressure gradient condition.

One type of bushing design which has been constructed to compensate for this pressure gradient condition has been to form the bushing with a rear motive surface which is offset toward the outlet side thereof whereby a greater resultant force of the fluid pressure acts against the outlet side thereof than against the inlet side thereof thereby tending to axially move the bushing toward the respective gear side face in a manner to compensate for the pressure gradient condition existing across the front face thereof. Another design has been to provide a piston member disposed between the rear side face of the bushing and the housing, the piston being offset relative to the axis of rotation of the gear whereby the piston is forced into engagement with the bushing by the force of the fluid pressure from the outlet of the pump and thus causes axial movement of the bushing into sealing engagement with the respective gear side face. Since the piston has a greater area thereof engaging the bushing on the outlet side thereof than on the inlet side thereof, this offset relation compensates for the pressure gradient condition acting across the front face of the bushing.

In these prior art designs the housing normally comprises a plurality of housing sections suitably fastened together in aligned relation whereby the gear receiving bores formed in each section are aligned in coaxial relation. The axially movable bushings are normally disposed in the housing bores in such a manner that portions thereof span the juncture between adjacent housing sections. Since the outer periphery of the axially movable bushings sealably engages the inner periphery of the housing defined by the housing bores formed therein, it is necessary that accurate alignment of the housing sections be maintained, as any misalignment of the housing bores will cause the axially movable bushings to be misaligned relative to the gear side faces thus preventing sealing engagement between the bushings and the adjacent gear side faces. One means to overcome this misaligned condition has been to utilize piston means for pressure loading the bushings means where the piston means is carried by a bore formed in one of the housing sections and the bushing means associated therewith is fully disposed within the bore in the adjacent housing section. However, when the piston is offset relative to the bushing to compensate for the aforementioned pressure gradient condition, some means must be provided to prevent the front face of the piston from bearing against the gear journal supported by the associated bushing means. If such means were not provided the rotating journal would cause wear on the piston means and there would be a loss of efficiency caused by the resulting friction therebetween. Further, the piston engaging the journal would tend to tip or skew the gear carried thereby and thus result in malfunctioning of the hydraulic apparatus.

It is therefore an object of this invention to provide an improved pressure loaded pump or motor.

It is a further object of this invention to provide an improved pressure loaded pump or motor wherein the axially movable bushings are forced into sealing relation with the rotatable pumping means by pressure loaded piston means which engage the respective bushings in offset relation to compensate for the pressure gradient condition existing across the front face of the bushings.

It is another object of this invention to provide a pressure loaded pump or motor comprising a housing, rotatable pumping means disposed in the housing for drawing fluid from an inlet, pressurizing the fluid, and forcing the same out an outlet under pressure, axially movable bushing means carried by the housing and adapted to be axially moved into sealing engagement with the rotatable pumping means, axially movable piston means carried by the housing, the piston means having abutment means adapted to engage the bushing means and being disposed closer to the outlet than to the inlet, and means for forcing the piston means against the bushing means whereby the bushing means is axially moved into sealing engagement with the rotatable pumping means.

Other and more particular objects, advantages, and uses of this invention will become apparent from a reading of the following specification taken in connection with the accompanying drawing forming a part thereof and wherein:

Fig. 1 illustrates, in an axial cross-sectional view, a pressure loaded pump or motor formed in accordance with the teachings of this invention;

Fig. 2 illustrates, in a cross-sectional view, the pump or motor of Figure 1, taken on line 2—2 thereof;

Fig. 3 illustrates, in a perspective view, one of the piston means utilized in the pump or motor of Figures 1 and 2.

Reference is now made to the accompanying drawings wherein like reference numerals and letters are used throughout the various figures thereof, where appropriate, to indicate like parts, and particular reference is made to Figure 1 illustrating a hydraulic pump or motor, generally indicated by the reference letter A, formed in accordance with the teachings of this invention and comprising a plurality of housing sections 10 and 11, suitably fastened together in aligned relation by a plurality of bolts 12.

The housing section 10 has an end surface 13 thereof interrupted by a pair of parallel intersecting bores 14 and 15. The bores 14 and 15 define an end wall 16 within the housing section 10.

A pair of rotatable gears 17 and 18 are disposed respectively in the bores 15 and 14 and are adapted to receive fluid from an inlet 19 formed in the housing section 10, pressurize the same, and force the fluid out of an outlet 20 formed in the housing section 10 in a manner well known in the pump art. It is to be understood that if the hydraulic apparatus A is to be utilized as a motor, fluid is forced into the apparatus A through the inlet 19 or outlet 20 causing rotation of the gears 17 and 18 and is expelled out through the outlet 20 or inlet 19 in a manner well known in the art.

The drive gear 17 has a pair of opposed, substantially flat, parallel side faces 21 and 22. The drive gear 17 is provided with a pair of journals 23 and 24 extending respectively and centrally from the side faces 21 and 22 thereof. The journals 23 and 24 may be formed integrally with the gear 17 in a manner well known in the art. The journal 23 comprises an elongated shaft adapted to project through a bore 25 formed in the housing section 10, whereby a suitable power source (not shown) may be coupled to an end 26 of the journal 23 to cause rotation of the gear 17. Suitable seal means 27 is carried by the housing section 10 to prevent fluid leakage from the interior of the housing sections 10 and 11 to the exterior of the housing section 10 through the bore 25.

The driven gear 18, similar to the drive gear 17, has a pair of opposed, substantially flat, parallel side faces 28 and 29 and a pair of journals 30 and 31 extending respectively and centrally from the side faces 28 and 29.

A pair of fixed bushings 32 and 33 are disposed respectively in the bores 15 and 14 between the wall 16 of the housing section 10 and the respective side faces 21 and 28 of the gears 17 and 18. The bushings 32 and 33 are provided respectively with a bore 34 and 35 passing therethrough whereby the respective journals 23 and 30 of the gears 17 and 18 are received and rotatably supported therein. The bushings 32 and 33 are provided respectively with substantially flat front faces 36 and 37 which cooperate respectively with the side faces 21 and 28 of the gears 17 and 18 to provide pumping seals therewith.

A pair of axially movable bushings 38 and 39 are disposed respectively within the bores 15 and 14 in the housing section 10 on the other side of the gears 17 and 18 with respect to the fixed bushings 32 and 33. The bushings 38 and 39 are provided respectively with bores 40 and 41 passing centrally therethrough, whereby the bores 40 and 41 are adapted to receive and rotatably support the respective journals 24 and 31 of the gears 17 and 18 in a manner well known in the art. The bushings 38 and 39 are provided respectively with flat front faces 42 and 43 which are adapted respectively to sealably engage the side faces 22 and 23 of the gears 17 and 18 to provide pumping seals therewith. The bushings 38 and 39 are also provided with rear faces or surfaces 44 and 45.

It can be seen that bushings 32 and 38 together with a portion of the housing section 10 defined by the bore 15 provide a pumping chamber B for the gear 17. Similarly, the bushings 33 and 39 together with a portion of the housing section 10 defined by the bore 14 provide a pumping chamber C for the gear 18.

The housing section 11 is provided with a pair of spaced parallel bores 46 and 47, the bores 46 and 47 being offset with respect to the axis of rotation of the respective gears 17 and 18 when housing section 11 is secured to the housing section 10 in the aforementioned aligned relation. The bores 46 and 47 are disposed closer to the outlet 20 than the inlet 19 for a purpose later to be described (see Fig. 2). The bores 46 and 47 are counter bored at 48 and 49, whereby the counter bores 48 and 49 interrupt an end surface 50 of the housing section 11. Chambers 51 and 52 are formed in the housing section 11 respectively behind the bores 46 and 47 and in fluid communication therewith.

A pair of piston means 53 and 54 are carried by the housing section 11 and each have a substantially cylindrical portion 55 adapted to be complementarily received within the respective bores 46 and 47. An annular groove 56 is formed in the outer periphery of the cylindrical portion 55 of each piston means 53 and 54. An O-ring seal 57 is received in each annular groove 56 whereby the counter bores 48 and 49 are sealed from the respective chambers 51 and 52. Each piston means 53 and 54 is provided with a front face 58 and a rear motive surface 59. A substantially annular abutment or flange means 60 is formed on the front face 58 of each piston means 53 and 54. It is to be understood, of course, that the abutment means 60 could be any desired shape or configuration, and need not be continuous, as illustrated, the important feature being that the abutment means 60 be adapted to engage the rear faces 44 and 45 of the axially movable bushings 38 and 39 whereby the front faces 58 of the piston means 53 and 54 are spaced from the bushings 38 and 39. Outlet fluid pressure is adapted to be conveyed to the chambers 51 and 52 respectively by passages 61 and 62 formed in the housing sections 10 and 11. It is to be understood that any other suitable means may be provided to convey fluid pressure to the chambers 51 and 52.

The force of the outlet or discharge fluid pressure conveyed to the chambers 51 and 52 acts against the rear motive surfaces 59 of the piston means 53 and 54 and forces the same axially to the left, as viewed in the drawings, whereby the annular abutment means 60 thereof engage the rear surfaces 44 and 45 of the bushings 38 and 39 and axially move the same to the left whereby the respective front faces 42 and 43 thereof sealably engage the respective side faces 22 and 29 of the gears 17 and 18 to provide pumping seals therewith. As shown in Figure 2 the annular abutment means 60 are disposed eccentrically about the journals 24 and 31 whereby the greater portions of the abutment means 60 are disposed on the outlet side of the bushings 38 and 39 than on the inlet side thereof. It should be noted that the annular abutment means 60 do not engage the journals 24 and 31 but are disposed adjacent thereto and bear only against the rear surfaces or faces 44 and 45 of the respective bushings 38 and 39.

Compression springs 63 and 64 are respectively disposed in the chambers 51 and 52 and have one end thereof engaging the rear motive surfaces 59 of the piston means 53 and 54 and the other end thereof engaging the housing section 11 whereby the springs 63 and 64 initially cause axial movement of the piston means 53 and 54 and subsequently, axial movement of the bushings 38 and 39 to the left, to provide pumping seal means with the gears 17 and 18.

Inlet fluid pressure is conveyed from the inlet 19 to the counter bores 48 and 49 by passage means 65 and 66 formed in the housing sections 10 and 11, as illustrated in Figure 2. It is to be understood that low fluid pressure can also be conveyed to the counter bores 48 and 49 in any other manner well known in the art.

A pair of bores 67 and 68 are formed in the housing section 10 and interrupt the end wall 16 thereof in such a manner that the bores 67 and 68 are disposed coaxially with respect to the axes of rotation of the gears 17 and 18. The bores 67 and 68 are adapted to receive low fluid pressure or inlet fluid pressure in a manner similar to the counter bores 48 and 49. The bushings 32, 33, 38 and 39 may be provided with substantially annular grooves 69 adapted to receive inlet fluid pressure. Cavities 70 formed between the piston means 53 and 54 and the respective bushings 38 and 39 are adapted to receive low fluid pressure by means of fluid leakage from the respective gears 17 and 18 through the clearance space between the journals 24 and 31 and the bores 40 and 41 of the bushings 38 and 39. In this manner, the bushings 32, 33, 38, 39, gears 17 and 18 and associated journals 23 and 24, 30 and 31, together with the piston means 53 and 54 have low pressure fluid circulated therearound whereby all the moving parts of the hydraulic unit A are adapted to be fully lubricated during operation thereof.

The operation of the hydraulic pump or motor A will now be described. When the apparatus A is being utilized as a pump, the journal 23 of the drive gear 17 is rotated by a suitable power source (not shown) in a clockwise direction. The driven gear 18 will be rotated in a counterclockwise direction through the meshing relation of the gear teeth of the gears 17 and 18. As the gears 17 and 18 rotate, the gear teeth thereof trap fluid, received from the inlet 19, between successive pairs of gear teeth thereof and convey the same around the bores 15 and 14 to the outlet 20 in a manner well known in the art. The fluid conveyed to the outlet 20 is placed under pressure. A portion of the outlet fluid pressure is conveyed by the passage means 61 and 62 to the respective pressure receiving chambers 51 and 52. The force of the pressure fluid in the pressure chambers 51 and 52 acts against the rear motive surfaces 59 of the piston means 53 and 54 and urges the same axially to the left, as viewed in the drawings, whereby the annular abutment means 60 thereof engages the rear surfaces 44 and 45 of the axially movable bushings 38 and 39. The annular abutment means 60 of the piston means 53 and 54 is adapted to be disposed eccentrically with respect to the axis of rotation of the respective gears 17 and 18 whereby the major portion thereof is disposed closer to the outlet 20 than to the inlet 19. The axial movement of the piston means 53 and 54 to the left causes axial movement of the bushings 38 and 39 to the left, whereby the respective front faces 42 and 43 thereof sealably engage the gear side faces 22 and 29 of the gears 17 and 18, providing pumping seals therewith. Because of the offset relation of the abutment means 60 relative to the bushings 38 and 39, it can be seen that a greater resultant force will be applied against the outlet side of the bushings 38 and 39 than on the inlet side thereof, thereby compensating for the pressure gradient condition existing across the front faces 42 and 43 of the bushings 38 and 39 as previously described.

It is to be understood that if it is desired to change the pumping direction, the housing section 11 is removed and inverted 180°. The housing section is then fastened in place to the housing section 10 in this inverted position whereby the piston means 53 and 54 are offset toward the inlet 19 now comprising the outlet and the outlet 20 becomes the inlet for the unit A. Similarly, the unit A can change the motoring direction when the unit A is utilized as a hydraulic motor.

Because the axially movable piston means 53 and 54 are carried by the housing section 11, and the axially movable bushings 38 and 39 are carried by the housing section 10, true alignment of the housing section 11 relative to the housing section 10 is not necessary and any misalignment therebetween will not result in misalignment of the axially movable bushings 38 and 39 relative to the gears 17 and 18. Further, the piston means 53 and 54 have been provided with abutment means 60 which are adapted to eccentrically encompass the respective journals 24 and 31 of the gears 17 and 18 thereby preventing engagement of the piston means 53 and 54 with the respective journals 24 and 31 thereby eliminating any detrimental effect of the piston means 53 and 54 on the alignment and operation of the gears 17 and 18.

As described above, it can be seen that an improved pressure loaded hydraulic apparatus has been described and comprises a housing, rotatable pumping means disposed in the housing for drawing fluid from an inlet, pressurizing the fluid, forcing it out an outlet under pressure, axially movable bushings carried by the housing and adapted to be axially moved into sealing engagement with the rotatable pumping means, axially movable piston means carried by the housing, the piston means having abutment means adapted to engage the bushing means and being disposed closer to the outlet than to the inlet, and means for forcing the piston means against the bushings whereby the bushings are axially moved into sealing engagement with the rotatable pumping means.

It can also be seen that means have been provided whereby the relatively moving parts of the hydraulic apparatus are completely surrounded by inlet fluid pressure for the purpose of lubrication as well as for the purpose of cooling the various parts.

While this invention has been disclosed in connection with one specific embodiment thereof, it is to be understood that this is by way of example rather than by limitation, and it is intended that this invention be defined by the appended claims.

What is claimed is:

1. In a hydraulic apparatus, the combination comprising: a housing; means defining a pumping chamber in said housing; means defining an inlet and an outlet in said housing, said inlet leading to and said outlet leading from said pumping chamber; rotatable pumping means disposed in said pumping chamber for drawing fluid from said inlet, pressurizing the fluid and forcing it out said outlet under pressure; said pumping means being provided with axially extending journals; axially movable bushing means carried by said housing for rotatably supporting said journals and adapted to be axially moved along said journals into sealing engagement with said rotatable pumping means; said bushing means being of lesser axial length than said journals; axially movable closed piston means carried by said housing, said piston means having front face means; means defining annular abutment means projecting from said front face means, said abutment means being adapted to eccentrically engage said bushing means and overlaying without contacting said journals and being disposed closer to said outlet than to said inlet; and means for forcing said piston means against said bushing means whereby said bushing means is axially moved into said sealing engagement with said rotatable pumping means.

2. In a hydraulic apparatus, the combination comprising: a housing; means defining a pumping chamber in said housing; means defining an inlet and an outlet in said housing, said inlet leading to and said outlet leading from said pumping chamber; rotatable pumping means disposed in said pumping chamber for drawing fluid from said inlet, pressurizing the fluid and forcing it out said outlet under pressure; said pumping means being provided with axially extending journals; axially movable bushing means carried by said housing for rotatably supporting said journals and adapted to be axially moved along said journals into sealing engagement with said rotatable pumping means; said bushing means being of lesser axial length than said journals; axially movable closed piston means carried by said housing, said piston means having front face means; means defining annular abutment means projecting from said front face means, said abutment means being adapted to eccentrically engage said bushing means and overlaying without contacting said journals and being disposed closer to said outlet than to said inlet; and means for forcing said piston means against said bushing means whereby said bushing means is axially moved into said sealing engagement with said rotatable pumping means, said means for forcing said piston means including biasing means disposed between said housing and said bushing means.

3. In a hydraulic apparatus, the combination comprising: a plurality of housing sections; means securing said housing sections in aligned relation to form a housing; means defining a pumping chamber in one of said housing sections; means defining an inlet and an outlet in said housing, said inlet leading to and said outlet leading from said pumping chamber; rotatable pumping means disposed in said pumping chamber for drawing fluid from said inlet, pressurizing the fluid and forcing it out said outlet under pressure; said pumping means being provided with axially extending journals; axially movable bushing means carried by said one housing section for rotatably supporting said journals and adapted to be axially moved along said journals into sealing engagement with said rotatable pumping means; said bushing means being of lesser axial length than said journals; axially movable closed piston means carried by another of said housing sections, said piston means having rear motive surface means and front face means; means defining annular abutment means projecting from said front face means, said abutment means being adapted to eccentrically engage said bushing means and overlaying without contacting said journals and being disposed closer to said outlet than to said inlet; and communication means for conveying outlet pressure to said rear surface means of said piston means for forcing said piston means against said bushing means whereby said bushing means is axially moved into said sealing engagement with said rotatable pumping means.

4. In a hydraulic apparatus, the combination comprising: a housing; means defining a pumping chamber in said housing; means defining an inlet and an outlet in said housing, said inlet leading to and said outlet leading from said pumping chamber; rotatable pumping means disposed in said pumping chamber for drawing fluid from said inlet, pressurizing the fluid and forcing it out said outlet under pressure; said pumping means being provided with axially extending journals; axially movable bushing means carried by said housing for rotatably supporting said journals and adapted to be axially moved along said journals into sealing engagement with said rotatable pumping means; said bushing means being of lesser axial length than said journals; axially movable closed piston means carried by said housing, said piston means having rear motive surface means and front face means; means defining annular abutment means projecting from said front face means, said annular abutment means being adapted to eccentrically engage said bushing means and overlaying without contacting said journals and being disposed closer to said outlet than to said inlet; and communication means for conveying outlet pressure to said rear surface means of said piston means for forcing said piston means against said bushing means whereby said bushing means is axially moved into said sealing engagement with said rotatable pumping means.

5. In a hydraulic apparatus, the combination comprising: a plurality of housing sections; means securing said housing sections in aligned relation to form a housing; means defining a pumping chamber in one of said housing sections; means defining an inlet and an outlet in said housing, said inlet leading to and said outlet leading from said pumping chamber; a pair of rotatable pumping means disposed in said pumping chamber for drawing fluid from said inlet, pressurizing the fluid and forcing it out said outlet under pressure; said pumping means being provided with axially extending journals; a pair of axially movable bushing means carried by said one housing section for rotatably supporting said journals, each bushing means adapted to be axially moved along said journals into sealing engagement with one of said rotatable pumping means; said bushing means being of lesser axial length than said journals; a pair of axially movable closed piston means carried by the other of said housing sections, each of said piston means having rear motive surface means and front face means; means defining an annular abutment means projecting from each of said front face means, each of said annular abutment means being adapted to eccentrically engage one of said bushing means and overlaying without contacting said journals and being disposed closer to said outlet than to said inlet; communication means for conveying outlet pressure to each of said rear surface means of said piston means for forcing each of said piston means against the respective bushing means whereby each of said bushing means is axially moved into said sealing engagement with its respective rotatable pumping means; and communication means for conveying inlet pressure between said bushing means and said piston means for lubricating said bushing means, said piston means, and said rotatable means.

6. In a hydraulic apparatus, the combination comprising: a housing; means defining a pumping chamber in said housing; means defining an inlet and an outlet in said housing, said inlet leading to and said outlet leading from said pumping chamber; a pair of rotatable meshing gears disposed in said pumping chamber for drawing fluid from said inlet, pressurizing the fluid and forcing it out said outlet under pressure, each gear having a side face and a journal extending therefrom; a pair of axially movable bushing means carried by said housing and each having a bore therein receiving and rotatably supporting one of said journals whereby each of said bushing means is adapted to be axially moved into sealing engagement with the side face of the respective gear; and bushing means being of lesser axial length than said journals; a pair of axially movable closed piston means carried by said housing, each of said piston means having rear motive surface means and front face means; means defining annular abutment means and overlaying without contacting said journals projecting from each of said front face means, each of said abutment means being adapted to engage one of said bushing means and being disposed closer to said outlet than said inlet; and communication means for conveying outlet pressure to each of said rear surface means of said piston means for forcing each of said piston means against the respective bushing means whereby each of said bushing means is axially moved into said sealing engagement with its respective side face.

7. In a hydraulic apparatus, the combination comprising: a plurality of housing sections; means securing said housing sections in aligned relation to form a housing; means defining a pumping chamber in one of said housing sections; means defining an inlet and an outlet in said housing, said inlet leading to and said outlet leading from said pumping chamber; a pair of rotatable meshing gears disposed in said pumping chamber for drawing fluid from said inlet, pressurizing the fluid and forcing it out said outlet under pressure, each of said gears having a side face and a journal extending therefrom; a pair of axially movable bushing means carried by said one housing section and each having a bore therein receiving and rotatably supporting one of said journals whereby each of said bushing means is adapted to be axially moved into sealing engagement with the side face of the respective gear; said bushing means being of lesser axial length than said journals; a pair of axially movable closed piston means carried by the other of said housing sections, each of said piston means having rear motive surface means and front face means; means defining an annular abutment means projecting from each of said front face means; each of said annular abutment means being adapted to engage one of said bushing means and being disposed eccentrically with respect to the axis of rotation of the respective journal and overlaying without contacting said journals; communication means for conveying outlet pressure to each of said rear surface means of said piston means for forcing each of said piston means against the respective bushing means whereby each of said bushing means is axially moved into said sealing engagement with its respective gear side face; and communication means for conveying inlet pressure between said piston means and said bushing means for lubricating said piston means, said bushing means, and said journals.

References Cited in the file of this patent

UNITED STATES PATENTS

| | | |
|---|---|---|
| 2,044,873 | Beust | June 23, 1936 |
| 2,312,891 | Ferris | Mar. 2, 1943 |
| 2,420,622 | Roth et al. | May 13, 1947 |
| 2,525,619 | Roth et al. | Oct. 10, 1950 |
| 2,641,192 | Lindberg | June 9, 1953 |
| 2,728,301 | Lindberg | Dec. 27, 1955 |
| 2,742,862 | Banker | Apr. 24, 1956 |
| 2,772,638 | Nagely | Dec. 4, 1956 |
| 2,848,953 | Nagely | Aug. 26, 1958 |
| 2,855,855 | Murray et al. | Oct. 14, 1958 |
| 2,880,678 | Hoffer | Apr. 7, 1959 |